US 8,341,946 B2

(12) United States Patent
Harmsen

(10) Patent No.: US 8,341,946 B2
(45) Date of Patent: Jan. 1, 2013

(54) EXHAUST-GAS AFTERTREATMENT SYSTEM

(75) Inventor: Jan Harmsen, Simpelveld (NL)

(73) Assignee: Ford Global Technologies, LLC, Dearborn, MI (US)

( * ) Notice: Subject to any disclaimer, the term of this patent is extended or adjusted under 35 U.S.C. 154(b) by 437 days.

(21) Appl. No.: 12/569,755

(22) Filed: Sep. 29, 2009

(65) Prior Publication Data

US 2010/0089034 A1    Apr. 15, 2010

(30) Foreign Application Priority Data

Oct. 13, 2008    (DE) .................... 10 2008 042 767

(51) Int. Cl.
*F01N 3/00*    (2006.01)
*F01N 1/00*    (2006.01)

(52) U.S. Cl. ............... 60/297; 60/274; 60/285; 60/296; 60/324

(58) Field of Classification Search .............. 60/287, 60/288, 292, 295, 296, 297, 274, 285, 324
See application file for complete search history.

(56) References Cited

U.S. PATENT DOCUMENTS

| | | | | |
|---|---|---|---|---|
| 3,889,464 A * | 6/1975 | Gardner | ......................... | 60/286 |
| 5,768,888 A * | 6/1998 | Matros et al. | .................. | 60/274 |
| 6,212,885 B1 * | 4/2001 | Hirota et al. | .................... | 60/288 |
| 6,312,650 B1 * | 11/2001 | Frederiksen et al. | ......... | 422/180 |
| 6,588,203 B2 * | 7/2003 | Hirota et al. | .................... | 60/297 |
| 6,964,161 B2 * | 11/2005 | Campbell | ....................... | 60/308 |
| 7,210,287 B2 * | 5/2007 | Bolander et al. | ............... | 60/296 |
| 7,640,728 B2 * | 1/2010 | Yoshizaki et al. | .............. | 60/286 |
| 7,640,731 B2 * | 1/2010 | Huang | ............................. | 60/297 |
| 7,735,314 B2 * | 6/2010 | Lu et al. | .......................... | 60/287 |
| 7,743,606 B2 * | 6/2010 | Havlena et al. | ................. | 60/295 |
| 7,827,782 B2 * | 11/2010 | Theis | .............................. | 60/286 |
| 7,900,443 B2 * | 3/2011 | Stieglbauer | ..................... | 60/297 |
| 2005/0247049 A1 * | 11/2005 | Kaboord et al. | ............... | 60/286 |
| 2006/0096281 A1 * | 5/2006 | Huang | ............................. | 60/297 |
| 2007/0199311 A1 * | 8/2007 | Kalish | ............................. | 60/295 |
| 2008/0066451 A1 * | 3/2008 | Warner et al. | ................... | 60/286 |
| 2008/0127635 A1 | 6/2008 | Hirata et al. | | |
| 2008/0314033 A1 * | 12/2008 | Aneja et al. | .................... | 60/297 |
| 2009/0019839 A1 * | 1/2009 | Gray, Jr. | .......................... | 60/287 |

FOREIGN PATENT DOCUMENTS

| | | |
|---|---|---|
| WO | 03/068362 | 8/2003 |
| WO | 2006/021337 | 3/2006 |
| WO | 2006/021338 | 3/2006 |

* cited by examiner

*Primary Examiner* — Kenneth Bomberg
*Assistant Examiner* — Jason Sheppard
(74) *Attorney, Agent, or Firm* — Julia Voutyras; Alleman Hall McCoy Russell & Tuttle LLP

(57) ABSTRACT

An exhaust-gas aftertreatment system for exhaust gases of an internal combustion engine. In one example, a portion of the engine exhaust gases goes to the particulate filter and the other portion of engine exhaust gases goes to the catalyst element. The outlet of the filter element is directed to the inlet of the catalyst element and the outlet of the catalyst element is directed to the inlet of the filter element. Thus, the engine exhaust gases are filtered and processed by a catalyst.

18 Claims, 3 Drawing Sheets

EXHAUST-GAS AFTERTREATMENT SYSTEM

CROSS REFERENCE TO PRIORITY APPLICATION

The present application claims priority to German Patent Application No. 102008042767.5, filed Oct. 13, 2008, titled "Exhaust-gas Cleaning System," the entire contents of each of which are incorporated herein by reference.

TECHNICAL FIELD

This description relates to an exhaust-gas aftertreatment system for exhaust gases of an internal combustion engine, in particular a diesel engine or a direct injection gasoline engine, said exhaust-gas aftertreatment system being arranged in an exhaust system and having a filter element and a catalyst element as exhaust-gas aftertreatment elements with a respective input side and a respective output side, the exhaust system having at least one inlet pipe and at least one outlet pipe.

BACKGROUND AND SUMMARY

US 2008/0127635 A1 discloses an exhaust-gas aftertreatment system with a housing in which a plurality of air paths produced by means of a dividing element are arranged. At least one catalyst and one particle filter are arranged in the housing. The at least one dividing element is arranged in a manner so as to result in the formation of two chambers which are located one above the other and are connected opposite the exhaust-gas inlet such that the exhaust-gas stream from the one chamber is deflected into the other chamber. This is to provide an exhaust-gas cleaning apparatus which is reduced in its longitudinal extent, since the two chambers are arranged lying one above the other. The exhaust-gas stream therefore flows successively through the cleaning elements arranged in the housing, said cleaning elements being connected virtually in a row.

WO2006/021337 A1 is concerned with a catalytically coated particle filter with a first and second end surface and an axial length. Starting from its first end surface, the particle filter is coated over part of its length with a first catalyst and, following the latter, with a second catalyst. The first catalyst has platinum and palladium on the first carrier material, whereas the second catalyst contains platinum and, if appropriate, palladium on second carrier materials. To this extent, the particle filter has two catalyst coatings lying in a row with respect to the exhaust-gas stream. Filters of this type have a high thermal mass and only heat up slowly, for which reason an increased concentration of noble metal is provided in the input region of the filter.

WO 2006/021338 A1 discloses a method for coating a wall flow filter. Wall flow filters have two end surfaces and a multiplicity of flow channels running parallel to the cylinder axis. In order to form the filtering effect, the flow channels are closed in an alternating manner at the first and second end surfaces. During its passage through the filter, the exhaust gas has to change over from the entry channels into the exit channels of the filter through the channel walls between the entry and exit channels.

The document 602 22 826 T2 (equivalent to part of WO03/068362) discloses a filter for the aftertreatment of exhaust gas. The filter has a plurality of flow channels which run axially and are closed in an alternating manner at least in a second filter section. The cylindrical filter is a filter roll of folded filter material which is coiled spirally from a web. In a first through-flow section, the exhaust gas flows through without being filtered. The first through-flow section is a central, inner section which is surrounded by the second filtering section of annular design. The central, inner section is merely a through-flow section with open flow channels. The filter section has a catalyst section and a particle filter section which are arranged in a manner such that they follow each other. In one configuration, one part of the exhaust-gas stream flows through the filter section and another part flows through the inner section without being filtered. However, as a result, some of the exhaust gases are not cleaned at all. In order to subject the entire exhaust-gas stream to a cleaning operation, an exhaust pipe is connected to the inner through-flow section such that the entire exhaust-gas stream flows through the through-flow section and enters a rear chamber without being filtered. In said chamber, the exhaust-gas stream is forced to flow back to the inlet side through the filter section in which the catalyst section and the filter section are arranged in a manner following each other similar to the embodiment of WO 2006/021338 A1.

In order to treat exhaust gases from an internal combustion engine, in particular a diesel engine, it is therefore known to arrange a catalyst element and a filter element, in particular a particle filter, in an exhaust system of the internal combustion engine. In this connection, the catalyst element is either arranged upstream of the particle filter or downstream of the particle filter, with it being possible for both components to be arranged in a common housing. Further, gas flow directed between the catalyst and particulate filter may also be included in the single common housing. Of course, the two components can also be arranged in a manner such that they follow each other in separate housings in the exhaust system.

If the particle filter is arranged upstream of the catalyst element, the combustion of soot (regeneration) can be carried out more rapidly, since the exhaust-gas stream still contains a sufficient amount of nitrogen oxide. However, it is disadvantageous that, due to the large thermal mass of the (diesel) particle filter, the temperature in the catalyst element rises very slowly, which results in a reduced conversion of nitrogen oxide by the catalyst. On the other hand, the catalyst or the catalyst element reaches its operating temperature more rapidly if it is arranged upstream of the (diesel) particle filter, which results in greater conversion of nitrogen oxide. However, due to reduced concentrations of nitrogen oxide in the exhaust gas, this results in a reduced combustion of soot, both during active and passive regeneration. Both combinations therefore have as many advantages as disadvantages.

The description is therefore based on the object of improving an exhaust-gas aftertreatment system of the type mentioned at the beginning using simple means in such a manner that exhaust gases, in particular diesel exhaust gases, can be cleaned more efficiently if a catalyst element and a filter element are combined with each other in an exhaust system.

According to the description, the object is achieved by an exhaust-gas aftertreatment system with the features of claim 1, wherein the inlet pipe is divided into a filter pipe and into a catalyst pipe in such a manner that one part of the entire exhaust-gas stream flows through the filter element and another part of the entire exhaust-gas stream flows through the catalyst element, wherein one exhaust-gas part-stream of the exhaust-gas stream emerging in each case from the filter element and the catalyst element is returned in each case via a return pipe, which is arranged in each case on the output side, to the input side of the respective other exhaust-gas aftertreatment element, and wherein the respective other part of the exhaust-gas stream emerging in each case on the outlet side from the filter element and the catalyst element is conducted into the outlet pipe of the exhaust system.

With the description, catalysts or catalyst elements and filter elements are therefore advantageously arranged in such a manner that one part of the entire exhaust-gas stream, i.e. a first part of the entire exhaust-gas stream, is forced, on the one hand, to flow through the catalyst element. Consequently, the other part of the entire exhaust-gas stream, i.e. a second part of the entire exhaust-gas stream, is forced, on the other hand, i.e. at the same time, to flow through the filter element parallel to the first part-stream, with respect to a main direction of flow. In this respect, a virtually parallel connection of the exhaust-gas aftertreatment elements is initially achieved, in which each exhaust-gas aftertreatment element treats one part of the entire exhaust-gas stream.

On the output side of the respective exhaust-gas aftertreatment device, the return pipe is in each case provided firstly as a filter return pipe and secondly as a catalyst return pipe. The filter return pipe returns exhaust gases emerging from the catalyst element to the input side of the filter element. The catalyst return pipe analogously returns the exhaust gases emerging from the filter element to the input side of the catalyst element.

The respective return pipe thus results virtually in an alternating series connection of the two exhaust-gas aftertreatment elements, with the catalyst element firstly being arranged upstream of the filter element for the partial quantity of emerging exhaust gas returned from the catalyst, and the filter element secondly being arranged upstream of the catalyst element for the partial quantity of emerging exhaust gas returned from the filter element.

In order to divide the entire exhaust-gas stream, the inlet pipe has a correspondingly designed component, preferably configured as a Y pipe. As a result, one part of the entire exhaust-gas stream flows in the direction of the filter element whereas the other part flows in the direction of the catalyst element. The respective branches (filter pipe, catalyst pipe) of the dividing component are preferably dimensioned in such a manner that half of the entire exhaust-gas stream is in each case supplied through the respective branch in a manner flowing to the input side of the respective exhaust-gas aftertreatment element. Advantageously, the size of the respective exhaust-gas aftertreatment elements is therefore preferably identical. It is expediently provided that a connecting side of the respective branch, which side opens into the respective inlet side of the respective exhaust-gas aftertreatment element, in each case occupies half of the respective inlet side. It is also possible to design the passages of the respective branches of the dividing component so as to differ such that one exhaust-gas aftertreatment element is supplied with a greater partial quantity of the entire exhaust-gas stream than the other exhaust-gas aftertreatment element. It is furthermore conceivable to arrange a control element in the region of the branch such that, even if the passage of the respective branch is identical in each case, a different part-stream quantity of the divided entire exhaust-gas stream can be achieved in each case. Of course, it is also possible to design the dimensions of the respective exhaust-gas aftertreatment element so as to differ.

On the output side, the respective exhaust-gas aftertreatment element in each case has the connecting element with the outlet pipe and the respective return pipe. In this case, the connecting element of the catalyst element is preferably designed as a T piece into which the connecting element of the filter element opens. Of course, the connecting elements can also have different configurations in order to provide an expedient flow path. The respective return line is designed with its connecting end arranged on the outlet side of the respective exhaust-gas aftertreatment element in such a manner that the exhaust-gas part-stream entering the respective exhaust-gas aftertreatment element (from the internal combustion engine) flows in each case into the respective return pipe. It is advantageous within the context of the description if at least the respective connecting end of the respective return pipe is designed such that it correspondingly matches the attachment size of the catalyst pipe or of the filter pipe.

In a particularly favorable embodiment, it is provided that the filter pipe is attached to the inlet side of the filter element directly opposite the catalyst return pipe, as seen in the axial direction. Analogously, the catalyst pipe is attached to the inlet side of the catalyst element directly opposite the filter return pipe, as seen in the axial direction. The filter return pipe is attached on the input side to the filter element directly opposite the connecting element to the output pipe, as seen in the axial direction. Analogously, the catalyst return pipe is attached on the input side of the catalyst element to the catalyst element directly opposite the connecting element to the outlet pipe, as seen in the axial direction. In this respect, the respective attachments to the respective exhaust-gas aftertreatment element are advantageously arranged in an alternating manner and are designed such that they are correspondingly matched in size. This means that the exhaust-gas part-streams flowing in each case (from the internal combustion engine) first of all flow through the respective exhaust-gas aftertreatment element. The respective exhaust-gas part-streams then enter the respective return line, flow through the respective other exhaust-gas aftertreatment element which is virtually connected in series, and enter via the respective connecting elements into the outlet pipe in which the previously divided exhaust-gas part-streams are mixed together again. It is therefore possible to process the entire exhaust-gas stream.

It is expedient within the context of the description if the filter element is additionally supplied on the input side with hydrocarbons, such as, for example, fuel in order, for example, to increase the temperature of the exhaust gas entering the filter element in each case. However, in particular in the region of the filter return pipe, this may, of course, also be provided in the region of the filter pipe. Of course, it is also conceivable if the catalyst element is supplied on the input side in each case with compounds, such as, for example, ammonia. This can also be provided in particular in the region of the catalyst return pipe, but, of course, also in the region of the catalyst pipe.

The respective return pipes can be matched in their course from the respective outlet side of the respective exhaust-gas aftertreatment element to the respective inlet side of the respective other exhaust-gas aftertreatment element to the construction space conditions, with, of course, a short flow path being desirable. Nevertheless, since the exhaust-gas part-streams which emerge from the respective exhaust-gas aftertreatment elements and are returned have a certain temperature, it can be provided to arrange the return pipes in such a manner that heat can be exchanged between the return pipes and the respective exhaust-gas aftertreatment elements. For example, the return pipes can each be arranged on a housing of the respective exhaust-gas aftertreatment element such that the latter achieves its operating temperature more rapidly by means of transfer of heat.

The catalyst element is expediently designed as an SCR catalyst (selective catalytic reduction), with the filter element being designed as a (diesel) particle filter, for which reason the description is particularly suitable in the case of diesel engines.

The above advantages and other advantages, and features of the present description will be readily apparent from the following Detailed Description when taken alone or in connection with the accompanying drawings.

BRIEF DESCRIPTION OF THE DRAWINGS

Further advantageous refinements of the description are disclosed in the dependent claims and in the following description of the figures:

FIG. 2a shows a schematic illustration of an alternative embodiment of an exhaust aftertreatment system in a single housing;

FIG. 2b shows a schematic illustration of an end cross-section of the aftertreatment system shown in FIG. 2a.

DETAILED DESCRIPTION

Figure 1:
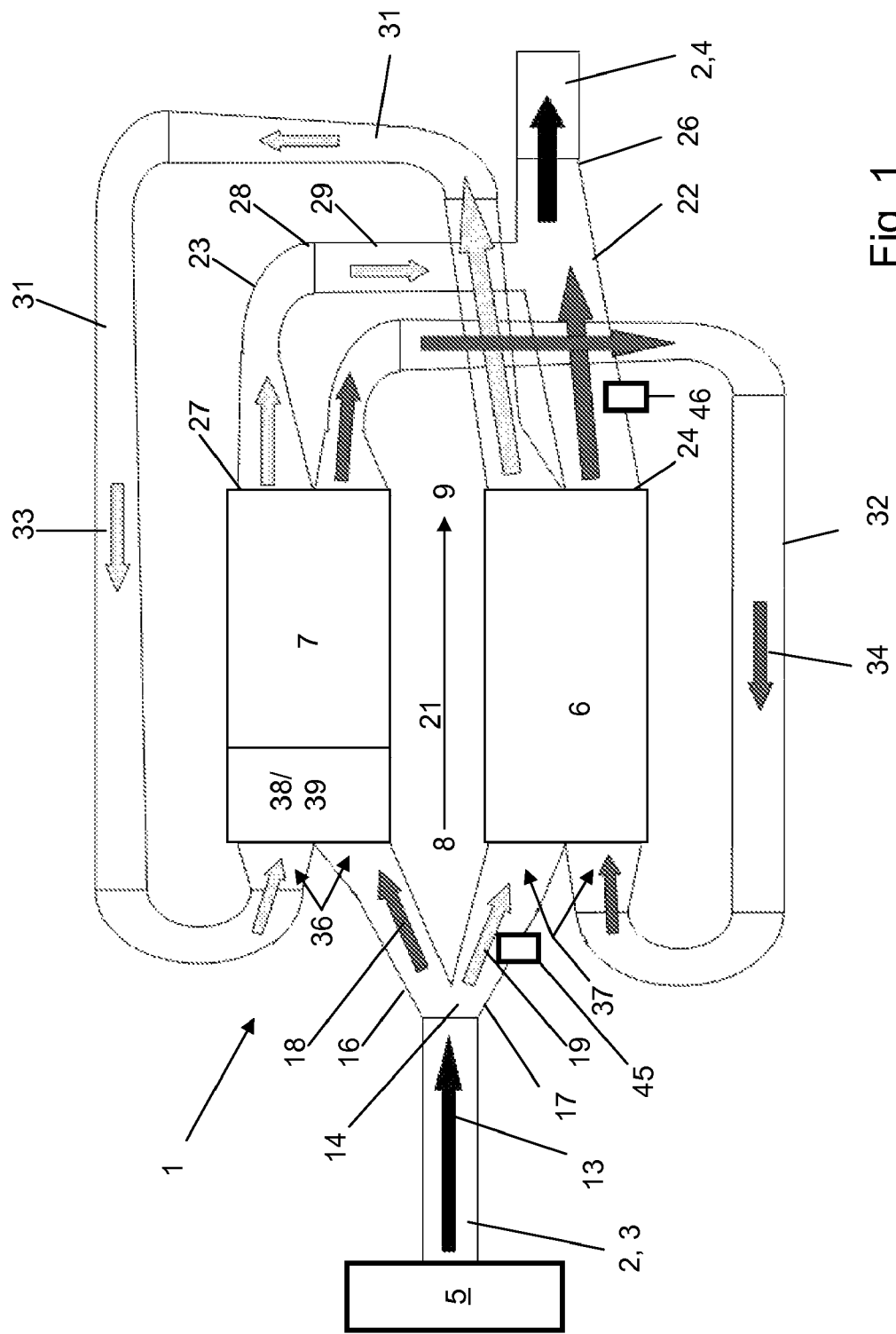
FIG. 1 shows a schematic illustration of an exhaust-gas aftertreatment system.

FIG. 1 shows an exhaust-gas aftertreatment system 1 for exhaust gases from an internal combustion engine, in particular from a diesel engine, said exhaust-gas aftertreatment system being arranged in an exhaust system 2. The exhaust system 2 has an inlet pipe 3 and an outlet pipe 4. The exhaust-gas aftertreatment system 1 has, by way of example, two exhaust-gas aftertreatment elements 6, 7, one of which is designed as a catalyst element 6 and the other as a filter element 7.

The two exhaust-gas aftertreatment elements 6, 7 each have an input side 8 and an opposite output side 9. Catalyst element 6 may be comprised of a three-way catalyst or a diesel oxidation catalyst or SCR or LNT.

The inlet pipe 3 conducts exhaust gases coming from the internal combustion engine 5 in the direction of the exhaust-gas aftertreatment system 1 (arrow 13). On the inlet side, the inlet pipe 3 has a component 14 for dividing the entire exhaust-gas stream 13, or a fork 14 which is formed, for example, with two identically designed branches 16 (filter pipe 16) and 17 (catalyst pipe 17) such that the entire exhaust-gas stream (arrow 13) is divided into two exhaust-gas part-streams (arrows 18 and 19). The respective branches 16 and 17 are each attached to the input side 8 of the respective exhaust-gas aftertreatment elements 6 and 7 such that exhaust gases from the engine pass initially through catalyst element 6 or filter element 7. Oxygen sensor 45 is shown positioned in catalyst pipe 17. In an alternative embodiment an oxygen sensor may be positioned in filter pipe 16.

The exhaust gases flowing into the respective exhaust-gas aftertreatment element 6 and 7 (exhaust-gas part-streams 18 and 19) flow through the respective exhaust-gas aftertreatment element 6 and 7 parallel with respect to a main direction of flow (arrow 21) such that, in this regard, a parallel connection of the exhaust-gas aftertreatment element 6 and 7 can also be spoken of.

On the outlet side, the respective exhaust-gas aftertreatment elements 6 and 7 have connecting elements 22 and 23 for connection to the outlet pipe 4. The connecting element 22 is designed, for example, as a T piece which is attached by a connecting side 24 to the output side 9 of the catalyst element 6. The connecting element 22 is attached opposite, at 26, to the outlet pipe 4. The connecting element 23 is designed, for example, as a pipe bend with an extension element, and is attached by its first connecting side 27 to the output side 9 of the filter element 7. At its second connecting end 28, the outlet pipe 23 is attached to a connecting piece 29 of the outlet pipe 22. Of course, the outlet pipe 23 can also lead at its connecting end 28 directly into the outlet pipe 22 or the outlet pipe 4. Further, outlet pipe 23 may lead directly to the tailpipe in dual exhaust configurations. And, Oxygen sensor 46 is shown positioned in outlet pipe 22. In an alternative embodiment an oxygen sensor may be positioned in filter pipe 16, or in both pipes.

In addition, outlet return pipes 31 and 32 are arranged on the output side 9 of the respective exhaust-gas aftertreatment elements 6 and 7. The outlet return pipe 31 is attached to the output side 9 of the catalyst element 6 as a filter outlet return pipe 31 and leads to the input side 8 of the filter element 7. The outlet return pipe 32 is attached to the output side 9 of the filter element 7 as a catalyst outlet return pipe 32 and leads to the input side 8 of the catalyst element 6.

The filter outlet return pipe 31 is arranged on the catalyst element 7 opposite the catalyst pipe 17, as seen in the axial direction. The catalyst outlet return pipe 32 is arranged on the filter element 6 opposite the filter pipe 16, as seen in the axial direction. In the exemplary embodiment illustrated in FIG. 1, the filter pipe 16 is arranged on the input side in a part of the filter element 7 which is at the bottom in the plane of the drawing. The catalyst return pipe 32 is arranged directly opposite on the output side in a part of the filter element 7 which is at the bottom in the plane of the drawing. The catalyst pipe 17 is arranged in a part of the catalyst element 6 that is at the top in the plane of the drawing, with the filter return pipe 31 being arranged directly opposite in a part of the catalyst element 6 which is at the top in the plane of the drawing. The catalyst outlet return pipe 32 is attached, by way of example, in a part of the catalyst element 6 which is at the bottom in the plane of the drawing, with the connecting piece 22 being attached opposite on the output side. The filter outlet return pipe 31 is analogously attached on the input side to a part of the filter element 7 which is at the top in the plane of the drawing, with the connecting piece 23 being attached opposite on the output side of the filter element 7. In this respect, the respective attachments and connections are arranged in an alternating manner. The exhaust-gas part-stream 18 first of all flows through the filter element 7, enters the catalyst outlet return pipe 32, is transported to the input side 8 of the catalyst element 6, enters here on the input side and flows through the catalyst element 6. On the output side, the exhaust-gas part-stream 18, which has thus passed virtually in a row through the two exhaust-gas aftertreatment elements 6 and 7, enters the connecting element 22 and thus passes into the outlet pipe 4. Analogously thereto, the exhaust-gas part-stream 19 first of all flows through the catalyst element 6 and enters the opposite filter outlet return pipe 31, is transported to the input side 8 of the filter element 7, enters here on the input side and flows through the filter element 7. On the output side, the exhaust-gas part-stream 19, which has thus likewise passed virtually in a row through the filter element 7 and the catalyst element 6, enters the connecting element 23 and thus passes into the outlet pipe 4.

In the outlet return pipe 31, the exhaust gas emerging from the catalyst element 6 flows in the direction of the inlet side 8 (arrow 33) of the filter element 7. The catalyst element 6 for the exhaust-gas part-stream 19 is therefore arranged virtually upstream of the filter element 7. In the outlet return pipe 32, the exhaust gas emerging from the filter element 7 flows in the direction of the inlet side 8 (arrow 34) of the catalyst element 6. The filter element 7 for the exhaust-gas part-stream 18 is therefore arranged, as it were, upstream of the catalyst element 6.

In an advantageous manner, it can be provided, on the input side of the filter element 7, to additionally add hydrocarbons, for example in the form of fuel, to the exhaust-gas streams 18 and/or 33 flowing in there, which is illustrated by means of the arrows 36. Analogously thereto, it can be provided, on the input side of the catalyst element 6, to additionally add nitrogen compounds, for example in the form of liquid urea (ammonia) to the exhaust-gas streams 19 and/or 34 flowing in there, which is illustrated by means of the arrows 37.

With the description, the disadvantages firstly of the filter element 7 arranged upstream of the catalyst element 6 and secondly of the catalyst element 6 arranged upstream of the filter element 7 are advantageously at least reduced. In this respect, the exhaust-gas aftertreatment system is improved using simple means in such a manner that cleaning of the exhaust gases is more efficient. This is because, with the description, part of the entire exhaust-gas stream 13 always flows successively through the two exhaust-gas aftertreatment elements 6 and 7 or 7 and 6.

In a preferred configuration, the catalyst element 6 is designed as an SCR catalyst, with the filter element 7 being designed as a diesel particle filter. In this respect, the description in its preferred embodiment is suitable for cleaning diesel exhaust gases from a diesel engine.

It is conceivable also to connect a diesel oxidation catalyst (DOC) 38 or a diesel exothermal catalyst (DEC) 39 in front of the filter element 7 on the input side, as indicated by way of example in FIG. 1.

Figures 2A, 2B:
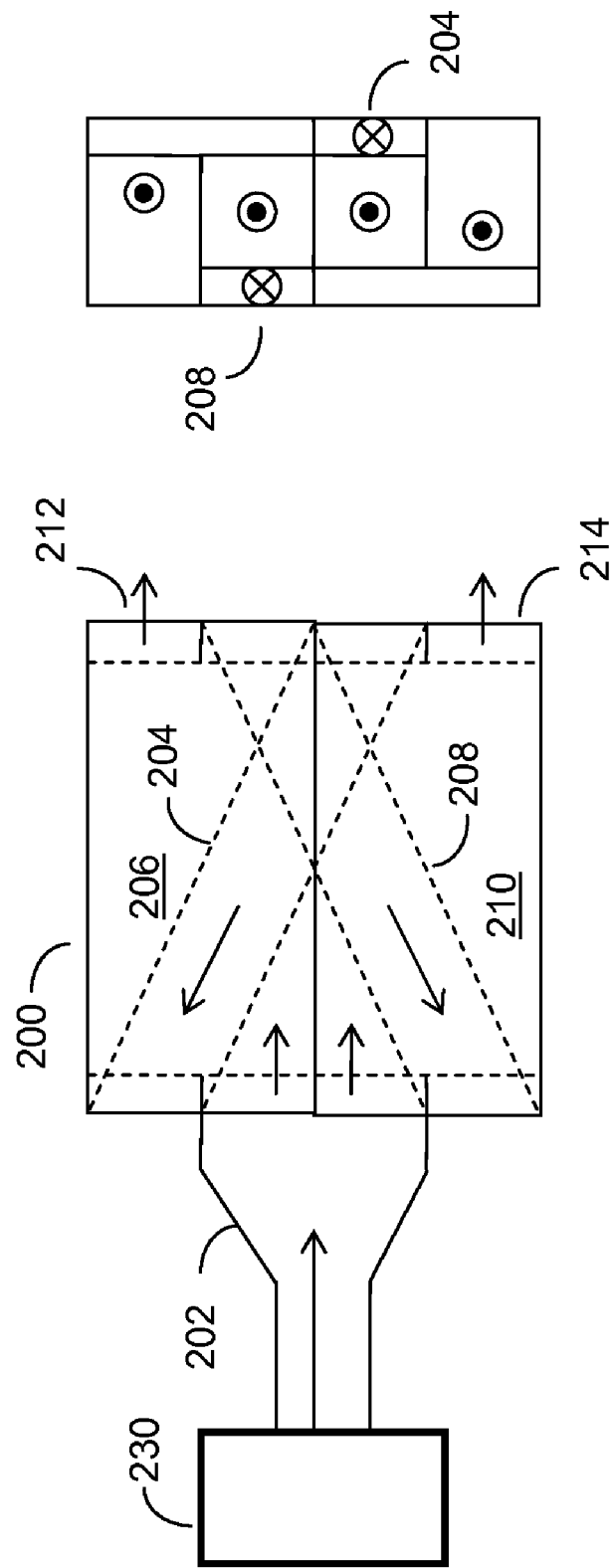

FIG. 2a shows an alternative embodiment of an exhaust aftertreatment system. Label 200 shows an example of a single housing that contains particulate filter 206 and catalyst 210 that processes exhaust gases from engine 230. Pipe 204 routes gases that have traveled through inlet 202 in the direction shown, and catalyst 210, back to the inlet of particulate filter 206. The gases then exit housing 200 at the outlet pipe 212. Pipe 208 routes gases that have traveled through inlet 202 in the direction shown, and particulate filter 206, back to the inlet of catalyst 210. The gases then exit housing 200 at the outlet pipe 214. Thus, the first outlet pipe 204 and the second outlet pipe 208 are contained in a single common housing and are routed to the inlet of the catalyst and the particulate filter respectively. Outlet pipes 212 and 214 may be tied together in a Y-pipe (not shown) or may be routed to the tailpipe or muffler for dual exhaust applications.

FIG. 2b shows a cross-section of the end of the aftertreatment system shown in FIG. 2a. The circles with an X indicate the direction of flow into the page and indicate the flow direction through passages 204 and 208. The circles with dots indicate flow out of the page in the passages leading from the catalyst and the particulate filter. Thus, the engine exhaust gases that initially pass through the catalyst are then routed to and pass through the particulate filter. Likewise, the engine exhaust gases that initially pass through the particulate filter are then routed to and pass through the catalyst. Accordingly, each portion of the total engine exhaust gases is filtered and processed by a catalyst.

Figure 3:
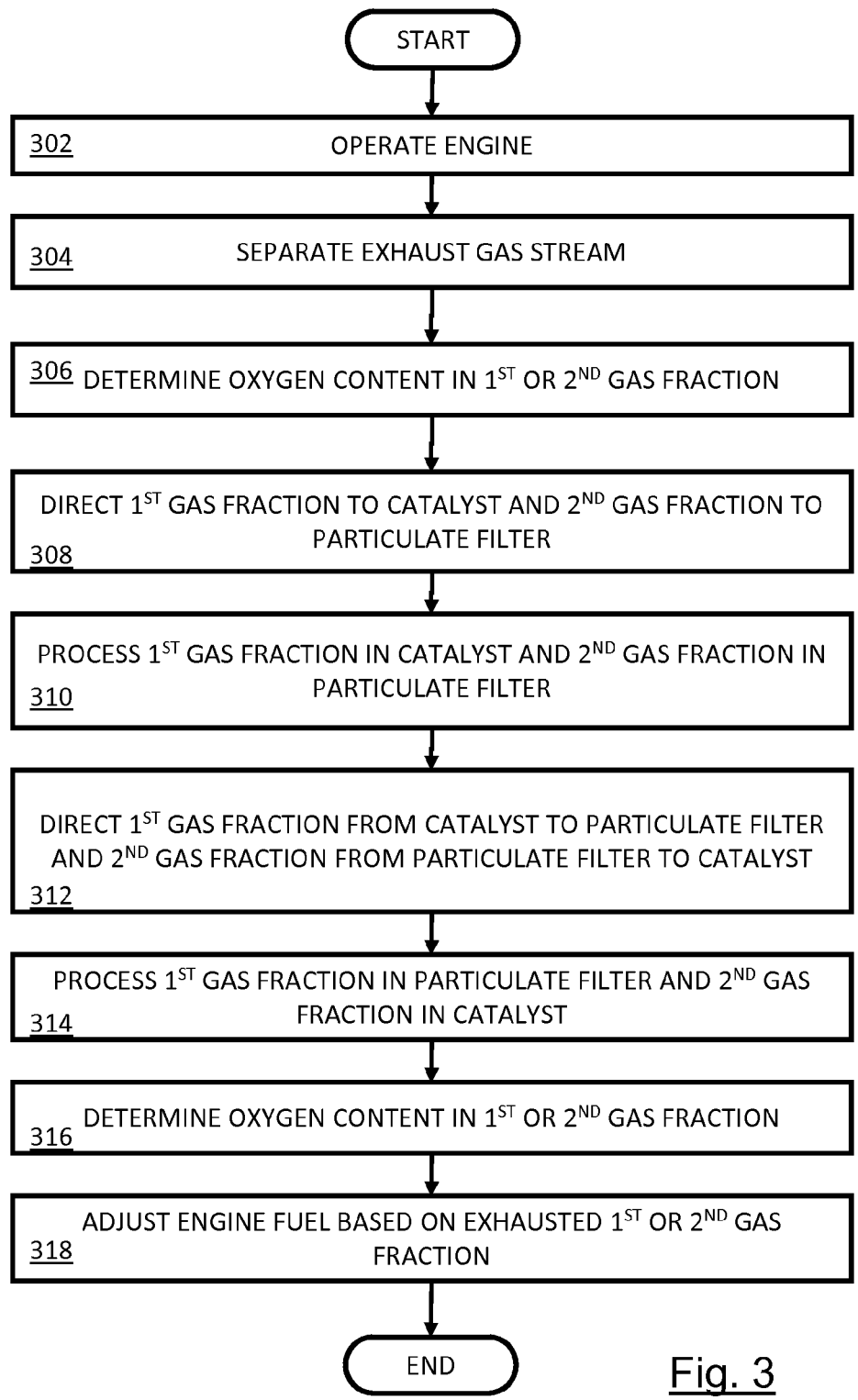
FIG. 3 shows a schematic illustration of a method for processing exhaust emission of an engine.

Referring now to FIG. 3, a schematic illustration of a method for processing exhaust emission of an engine is shown. At 302, an engine is operated. The engine may be a direct injection engine that operates with gasoline or diesel fuel. At 304, an exhaust stream from the engine is separated into to a first fraction and a second fraction by way of a Y pipe for example. At 306, the oxygen content of the first or second gas fraction is determined from a first oxygen sensor. At 308, the first exhaust gas fraction is directed to a catalyst and the second exhaust fraction is directed to a particulate filter. In one example, the exhaust gases are directed from the catalyst to the particulate filter and from the particulate filter to the catalyst by pipes. At 310, the first exhaust gas fraction is processed by a catalyst and the second exhaust gas fraction is processed by a particulate filter. At 312, the first exhaust gas fraction is directed from the catalyst to the filter and the second exhaust gas fraction is directed from the filter to the catalyst. At 314, the first exhaust gas fraction is processed by the particulate filter and the second exhaust gas fraction is processed by the catalyst. In one example, the catalyst is a three-way catalyst and in another example the catalyst is an oxidation catalyst. At 316, the oxygen concentration of the first or second gas fraction is determined from a second oxygen sensor. At 318, fuel injected to the engine is adjusted in response to the first and second oxygen sensors. For example, the duration that fuel is injected to a particular cylinder of the engine is increased in response to a lean fuel mixture determined from the first and second oxygen sensors.

It will be appreciated that the configurations disclosed herein are exemplary in nature, and that these specific embodiments are not to be considered in a limiting sense, because numerous variations are possible. For example, the above systems can be applied to V-6, I-4, I-6, V-12, opposed 4, and other engine types.

The subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust-gas aftertreatment system for exhaust gases of an internal combustion engine, comprising:
   a filter element having an input side and an output side;
   a catalyst element having an input side and an output side;
   an inlet pipe that is divided into a filter pipe and a catalyst pipe on said input side of said filter element and said catalyst element such that one part of an entire exhaust-gas stream flows directly from said inlet pipe to said filter pipe and directly from said filter pipe to said filter element and another part of said entire exhaust-gas stream flows directly from said inlet pipe to said catalyst pipe and directly from said catalyst pipe to said catalyst element;
   a first return pipe positioned downstream of said filter element and upstream of said catalyst element when said one part of said entire exhaust-gas stream flows directly from said inlet pipe to said filter pipe and directly from said filter pipe to said filter element and when another part of said entire exhaust-gas stream flows directly from said inlet pipe to said catalyst pipe and directly from said catalyst pipe to said catalyst element; and
   a second return pipe positioned downstream of said catalyst element and upstream of said filter element when said one part of said entire exhaust-gas stream flows directly from said inlet pipe to said filter pipe and directly from said filter pipe to said filter element and when another part of said entire exhaust-gas stream flows directly from said inlet pipe to said catalyst pipe and directly from said catalyst pipe to said catalyst element, and wherein said catalyst element and said filter element are contained in a single housing, and wherein said first return pipe is positioned directly opposite said filter pipe on the output side of said filter element, and wherein said second return pipe is positioned directly opposite said catalyst pipe on said output side of said catalyst element.

2. The exhaust-gas aftertreatment system of claim 1, further comprising a first outlet pipe having an inlet positioned at said output side of said catalyst element and a second outlet pipe having an inlet positioned at said output side of said filter element.

3. The exhaust-gas aftertreatment system of claim 1, further comprising a first outlet pipe having a first inlet positioned at said output side of said catalyst element and a second inlet positioned at said output side of said filter element.

4. The exhaust-gas aftertreatment system of claim 1, wherein a first outlet pipe is positioned directly opposite the first return pipe on the output side of the catalyst element, and wherein a second outlet pipe is positioned directly opposite the second return pipe on the output side of the filter element.

5. The exhaust-gas aftertreatment system of claim 1, wherein said filter pipe is positioned at said input side of said filter element directly opposite from said first return pipe, as viewed in an axial direction.

6. The exhaust-gas aftertreatment system of claim 1, wherein said catalyst pipe is positioned at said input side of said catalyst element directly opposite from said second return pipe, as viewed in an axial direction.

7. The exhaust-gas aftertreatment system of claim 1, where said catalyst element is positioned both simultaneously upstream and downstream of said filter element when said entire exhaust-gas stream is flowing through said filter pipe and said catalyst pipe.

8. The exhaust-gas aftertreatment system of claim 1, wherein said filter element is a particulate filter.

9. The exhaust-gas aftertreatment system of claim 1, wherein said catalyst element is a three-way catalyst.

10. The exhaust-gas aftertreatment system of claim 1, further comprising an oxygen sensor positioned upstream of or in at least one of said filter pipe or said catalyst pipe.

11. The exhaust-gas aftertreatment system of claim 2, further comprising an oxygen sensor positioned in at least one of said first outlet pipe or said second outlet pipe.

12. A method for processing exhaust gases of an engine, comprising:
   operating an engine;
   separating an exhaust flow from said engine into a first fraction and a second fraction;
   directing said first fraction of exhaust gas to a catalyst;
   directing said second fraction of exhaust gas to a particulate filter;
   directing said first fraction of exhaust gas from the catalyst to said particulate filter; and
   directing said second fraction of exhaust gas from the particulate filter to said catalyst, and wherein said first fraction of exhaust gas is directed to an input side of said particulate filter after passing through said catalyst by way of a first pipe while said second fraction of exhaust gas is directed to an input side of said catalyst by way of a second pipe after passing through said particulate filter.

13. The method of claim 12, wherein said second fraction of exhaust gas is recombined with said first fraction of exhaust gas after said second fraction passes through said particulate filter and after said first fraction of exhaust gas passes through said catalyst.

14. The method of claim 12 wherein said engine is a direct injection gasoline engine.

15. The method of claim 12 wherein said engine is a diesel engine.

16. A method for processing exhaust gases of an engine, comprising:
   operating an engine;
   separating an exhaust flow from said engine into a first fraction and a second fraction;
   directing said first fraction of exhaust gas to a catalyst while directing said second fraction of exhaust gas to a particulate filter;
   directing said first fraction of exhaust gas to said particulate filter while directing said second fraction of exhaust gas to said catalyst; and adjusting a fuel amount delivered to said engine in response to an oxygen concentration of gases of said first fraction of exhaust gas or in response to an oxygen concentration of gases of said second fraction of exhaust gas.

17. The method of claim 16 wherein said engine is a direct injection gasoline engine.

18. The method of claim 16 wherein said engine is a diesel engine.

* * * * *